(12) United States Patent
Thakur

(10) Patent No.: US 9,281,737 B2
(45) Date of Patent: Mar. 8, 2016

(54) VOLTAGE CONVERTER

(71) Applicant: Nishant Singh Thakur, Indore (IN)

(72) Inventor: Nishant Singh Thakur, Indore (IN)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 150 days.

(21) Appl. No.: 14/170,650

(22) Filed: Feb. 3, 2014

(65) Prior Publication Data

US 2015/0222172 A1  Aug. 6, 2015

(51) Int. Cl.
*H02M 3/158* (2006.01)
*H02M 1/08* (2006.01)
*H02M 3/155* (2006.01)
*H02M 1/00* (2007.01)

(52) U.S. Cl.
CPC ............... *H02M 1/08* (2013.01); *H02M 3/155* (2013.01); *H02M 2001/0048* (2013.01)

(58) Field of Classification Search
CPC ................................ H02M 1/08; H02M 3/158
USPC .......................... 323/282–288, 311, 271, 272
See application file for complete search history.

(56) References Cited

U.S. PATENT DOCUMENTS

| | | | |
|---|---|---|---|
| 6,492,793 B1 | 12/2002 | Bentolila | |
| 6,504,351 B2 | 1/2003 | Eager | |
| 6,580,258 B2 | 6/2003 | Wilcox | |
| 6,686,729 B1* | 2/2004 | Kawamura et al. | 323/282 |
| 7,839,131 B2* | 11/2010 | Yang et al. | 323/282 |
| 8,278,886 B2 | 10/2012 | Megaw | |
| 8,547,078 B2 | 10/2013 | Chiu | |
| 2014/0347078 A1* | 11/2014 | Qin | G01R 19/0092 324/713 |

OTHER PUBLICATIONS

Jon Gladish, "MOSFET selection to minimize losses in low-output-voltage DC-DC converters", Fairchild semiconductor power seminar 2008-2009.*

* cited by examiner

*Primary Examiner* — Timothy J Dole
*Assistant Examiner* — Htet Z Kyaw
(74) *Attorney, Agent, or Firm* — Charles E. Bergere

(57) ABSTRACT

A voltage converter such as a DC-DC buck regulator includes a driver circuit that enables charge stored on the parasitic capacitance of a transistor switch to be transferred to a load capacitor. Hence, stored charge can be harvested for use by a load, thereby increasing efficiency of the regulator.

10 Claims, 3 Drawing Sheets

VOLTAGE CONVERTER

BACKGROUND OF THE INVENTION

The present invention relates generally to voltage converters, and, more particularly, to step down DC-to-DC converters that convert a voltage from a primary power source to a stepped-down voltage.

With reference to FIG. 1, in a typical step down converter, also known as a buck regulator 100, current through an inductor 101 is controlled by a switching transistor 102, typically a power transistor, (e.g., P-channel metal oxide semiconductor field effect transistor (PMOSFET)) and a diode 103. A drive signal is generated by a drive circuit 104 and applied to the gate of the switching transistor 102. When the switching transistor 102 is first turned on, the inductor 101 produces an opposing voltage and commences to store energy in response to the charging current, which reduces the net voltage across a load 105. When the switching transistor 102 is turned off, the diode 103 is forward biased and energy stored in the inductor 101 supports current flow through the load 105. If the switching transistor 102 is turned on again before the inductor 101 completely discharges its stored energy, the voltage across the load 105 will be greater than zero. A capacitor 106 is placed across the load 105 to smooth out voltage fluctuations as the inductor 101 stores and discharges energy with each switching cycle.

A typical driver circuit for the switching transistor 102 includes a PMOS (P-channel metal oxide semiconductor) transistor 107 coupled in series with a NMOS (N-channel metal oxide semiconductor) transistor 108 between a power supply Vin and ground. When the switching transistor 102 is to be driven off, the PMOS transistor 107 is turned on in order to drive the gate of the switching transistor 102 to Vin. When the gate of the switching transistor 102 is driven high, the parasitic capacitance of the transistor 102 is charged towards Vin and reaches Vin if the gate of the PMOS transistor 107 is on for a sufficient length of time. The NMOS transistor 108 is used to drive the gate of the switching transistor 102 to ground in order to turn the transistor 102 on. When the NMOS transistor 108 is on (and conducting), it discharges the parasitic capacitance to ground and the charge stored on it is lost.

Buck regulators suffer various losses that affect efficiency, with efficiency tending to be lower under low load current conditions than higher current conditions. In certain conditions it may be that the energy required to turn power devices on and off is greater than that required by the load itself. Two significant factors that can affect efficiency in both high and low load conditions are conduction loss and switching loss in the switching transistor, with switching losses being worse at higher switching frequencies (typically 1 MHz or 2 MHz). Conduction loss may be reduced by using larger devices and charge pumps, but both these measures can have adverse effects on switching loss. On the other hand, switching loss can arise due to the repeated charging and discharging of the gate capacitance of the switching transistor. Accordingly, it would be advantageous to provide a regulator whose switching losses are low enough to permit the use of larger power devices, charge pumps and operating at higher frequencies, yet still exhibit a high overall efficiency under high and low load conditions.

BRIEF DESCRIPTION OF THE DRAWINGS

The invention, together with objects and advantages thereof, may best be understood by reference to the following description of preferred embodiments together with the accompanying drawings in which.

DETAILED DESCRIPTION OF PREFERRED EMBODIMENTS

Figure 1:
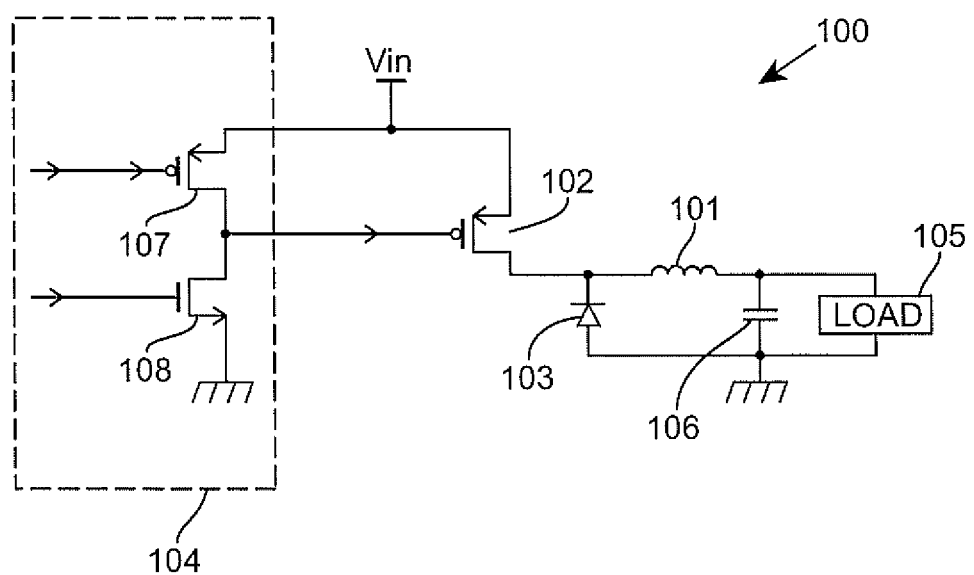
FIG. 1 is schematic circuit diagram of a conventional voltage converter.

The detailed description set forth below in connection with the appended drawings is intended as a description of presently preferred embodiments of the invention, and is not intended to represent the only forms in which the present invention may be practised. It is to be understood that the same or equivalent functions may be accomplished by different embodiments that are intended to be encompassed within the spirit and scope of the invention.

In the drawings, like numerals are used to indicate like elements throughout. Furthermore, the terms "comprises," "comprising," or any other variation thereof, are intended to cover a non-exclusive inclusion, such that module, circuit, device components, structures and method steps that comprises a list of elements or steps does not include only those elements but may include other elements or steps not expressly listed or inherent to such module, circuit, device components or steps. An element or step proceeded by "comprises . . . a" does not, without more constraints, preclude the existence of additional identical elements or steps that comprises the element or step.

In one embodiment, the present invention provides a voltage regulator comprising a semiconductor switch coupled to an inductor; a rectifier coupled to the inductor; a load capacitor coupled to the inductor; and a driver circuit for driving a gate terminal of the semiconductor switch to turn the semiconductor switch on and off. The driver circuit is connected to the load capacitor so that charge stored on a parasitic capacitance of the semiconductor switch is transferred to the load capacitor.

In another embodiment, the invention provides a method of operating a voltage converter, where the voltage converter includes a semiconductor switch coupled to an inductor; a rectifier coupled to the inductor; a load capacitor coupled to the inductor; and a driver circuit for driving a gate terminal of the semiconductor switch to turn the semiconductor switch on and off. The method comprises driving the switching transistor to an off state and allowing charge to accumulate on the parasitic capacitance of the gate of the switching transistor. The accumulated charge is then transferred to the load capacitor for a predetermined length of time. After the predetermined length of time has elapsed, the gate may be discharged to ground.

Advantageously, instead of discharging the gate of the switching transistor to ground, as is done in known systems, by transferring it to the load capacitor instead, this charge can be used by the load, thereby taking less power from the primary voltage source. Thus, efficiency of a voltage converter is improved. This brings added benefits such as the possibilities of increased frequency of operation and the use of external components with smaller silicon area and lower cost. A voltage converter in accordance with the invention can provide an improved efficiency under both high and low load conditions. The invention lends itself to incorporation in switching mode power supplies (SMPS) and has the further advantage that for some systems, it obviates the requirement for a low power regulator that is used to provide supply voltage to a load in light conditions where the high power SMPS is turned off due to low efficiency.

In some embodiments, a voltage converter in accordance with the invention may be turned on and off depending on the power mode of an integrated circuit (or "System on Chip", SoC device) that it may be used to power.

In another embodiment, the driver circuit may be arranged to use a self-timed pulse source in order to control recovery of the switching transistor's gate charge.

In another embodiment, the facility for transferring charge to the load can be selectively turned on or off depending on operating requirements and without disabling the voltage converter.

In different embodiments, the invention can be used as either a synchronous or asynchronous voltage converter (or regulator). The principles of the invention may be applied to a boost regulator as well as a DC-DC down-converter.

Figure 2:
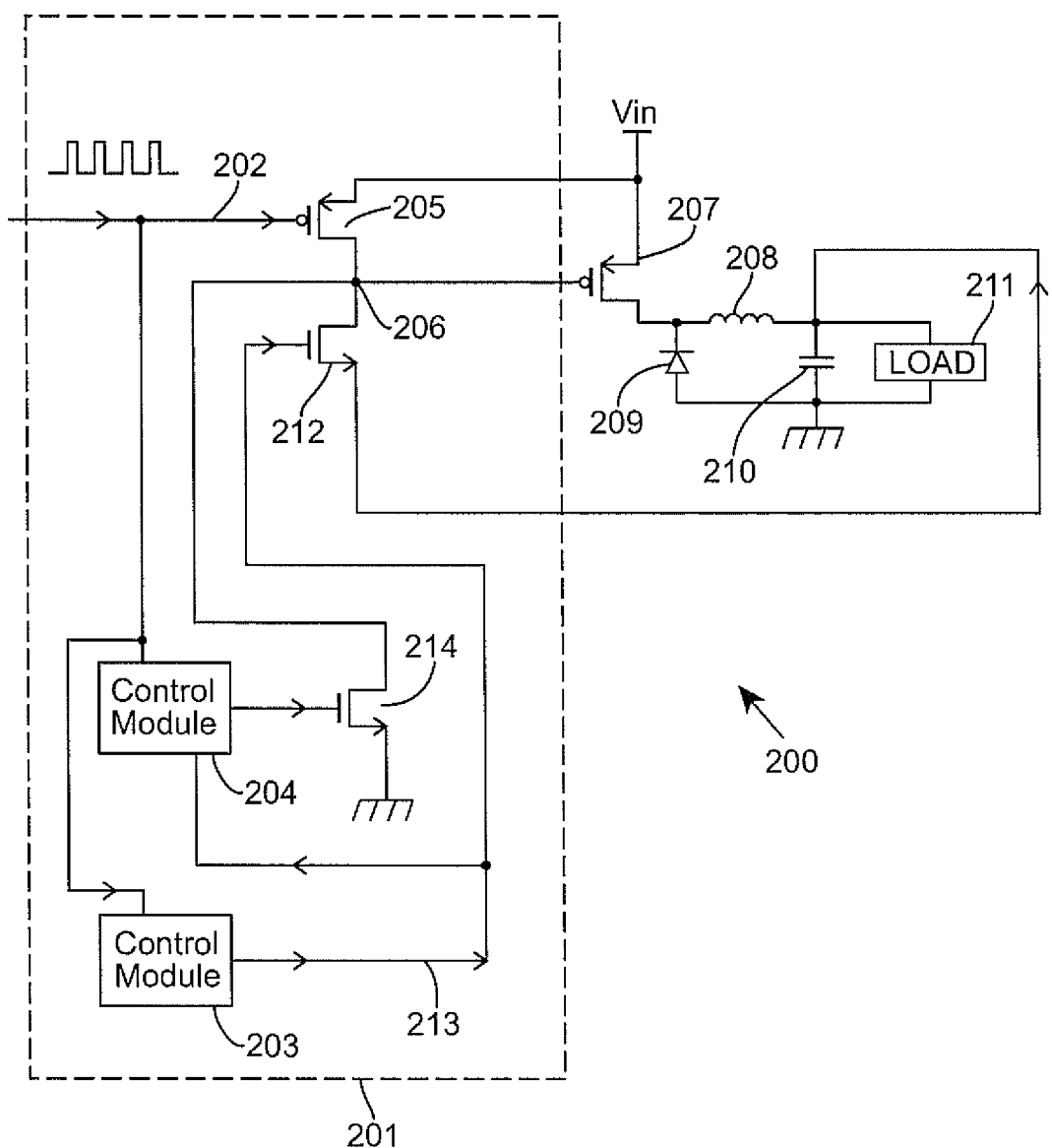
FIG. 2 is a simplified block diagram of a voltage converter in accordance with an embodiment of the present invention.

Referring now to FIG. 2, a voltage converter 200 in accordance with a first embodiment of the present invention is shown. This first embodiment is an example of an asynchronous converter. A driver circuit 201 receives a pulse width modulated (PWM) signal on an input line 202. The PWM signal may be generated by conventional means. The PWM signal is fed to first and second control modules 203, 204 respectively and to a gate terminal of a first transistor 205. The first and second control modules 203, 204 may comprise simple logic elements or analog blocks that generate control signals for enabling the driver circuit 201 to perform certain functions to be described in greater detail below.

The first transistor 205, in this example, is a P-channel MOS (PMOS) transistor having a source terminal connected to a power supply Vin and a drain terminal connected to a node 206.

Also connected to the node 206 is a gate terminal of a switching transistor 207. In this example, the switching transistor 207 is a power P-channel MOSFET (metal oxide semiconductor) transistor whose source terminal is connected to Vin. In some embodiments, the driver circuit 201 and the switching transistor 207 are powered by separate supplies. In some embodiments, certain modules and circuit elements comprising the driver circuit 201 may be powered by separate supplies.

A drain terminal of the switching transistor 207 is connected to a first terminal of an inductance 208 and to a cathode of a rectifier diode 209 whose anode is connected to ground. A second terminal of the inductance 208 is connected to a first terminal of a load capacitor 210, while the second terminal of the load capacitor 210 is connected to ground. A load 211 is connected across the capacitor 210.

Also connected to the node 206 is a drain terminal of a second transistor 212 that in this embodiment is an N-channel MOS (NMOS) transistor. A source terminal of the second transistor 212 is connected to the first terminal of the capacitor 210 for transferring parasitic charge stored on the gate of the switching transistor 207 under certain operating conditions. A gate terminal of the second transistor 212 is connected to an output line 213 of the first control module 203.

The output line 213 of the first control module 203 is also connected to a second input of the second control module 204. An output of the second control module 204 is connected to a gate terminal of a third transistor 214. In this embodiment, the third transistor 214 is a NMOS transistor having a source terminal connected to ground. A drain terminal of the third transistor 214 is connected to the node 206. Under certain operating conditions, the third transistor 214 provides a current path to ground for charge residing on the parasitic capacitance of the gate terminal of the switching transistor 207. This current path can be switched in and out under the control of the second control module 204.

In operation, the PWM signal on line 202 controls the gate of the first transistor 205 such that it causes the first transistor 205 to turn the switching transistor 207 off and on at a rate set by the frequency of the PWM signal. When the first transistor 205 is on, it drives the gate of the switching transistor 207 towards Vin so that the switching transistor 207 is turned off. During this time, the parasitic capacitance on the gate of the switching transistor 207 charges up and will reach Vin if the gate of the first transistor 205 is on for a sufficient length of time. While the PWM signal on line 202 is low, the first transistor 205 will remain on and the switching transistor 207 will remain off. When the PWM signal on line 202 goes high, the first transistor 205 turns off and the second transistor 212 turns on at a time and for a time period set by a control signal from the first control module 203. This control signal is applied to the gate of the second transistor 212. While the second transistor 212 is on (and conducting), it transfers the charge stored on the parasitic capacitance of the gate of the switching transistor 207 to the load capacitor 210. The duration of this discharge operation is set by an output pulse generated by the first control module 203. After a certain length of time during which this charge is transferred, the third transistor 214 is turned on by a control signal from the second control module 204 applied to the gate of the third transistor 214 and it is ensured that both the second transistor 212 and the third transistor 214 are not on at the same time. When the third transistor 214 is on, it closes a current path between the gate of the switching transistor 207 and ground, which completely discharges the gate of the switching transistor 207. The second transistor 212 remains on while the PWM signal is high and during this time the switching transistor is on. As soon as the PWM signal goes low again, a signal from the second control module turns the third transistor 214 off. The PWM signal going low also causes the switching transistor 207 to turn off. Discharging the gate capacitance of the switching transistor 207 all the way to ground avoids a high "on" resistance and the undesirable, resulting power loss. When the switching transistor 207 is driven on again, the charge harvesting cycle may repeat. A slew rate of the charge and discharge of the gate capacitance of the switching transistor 207 can be pre-set by choosing components of the driver circuit 201 with certain characteristics. For example, such characteristics can be the strength of the first, second and third transistors 205, 212, 214. For example, second and third transistors 212, 214 of a relatively large size will discharge the gate capacitance relatively quickly.

Figure 3:
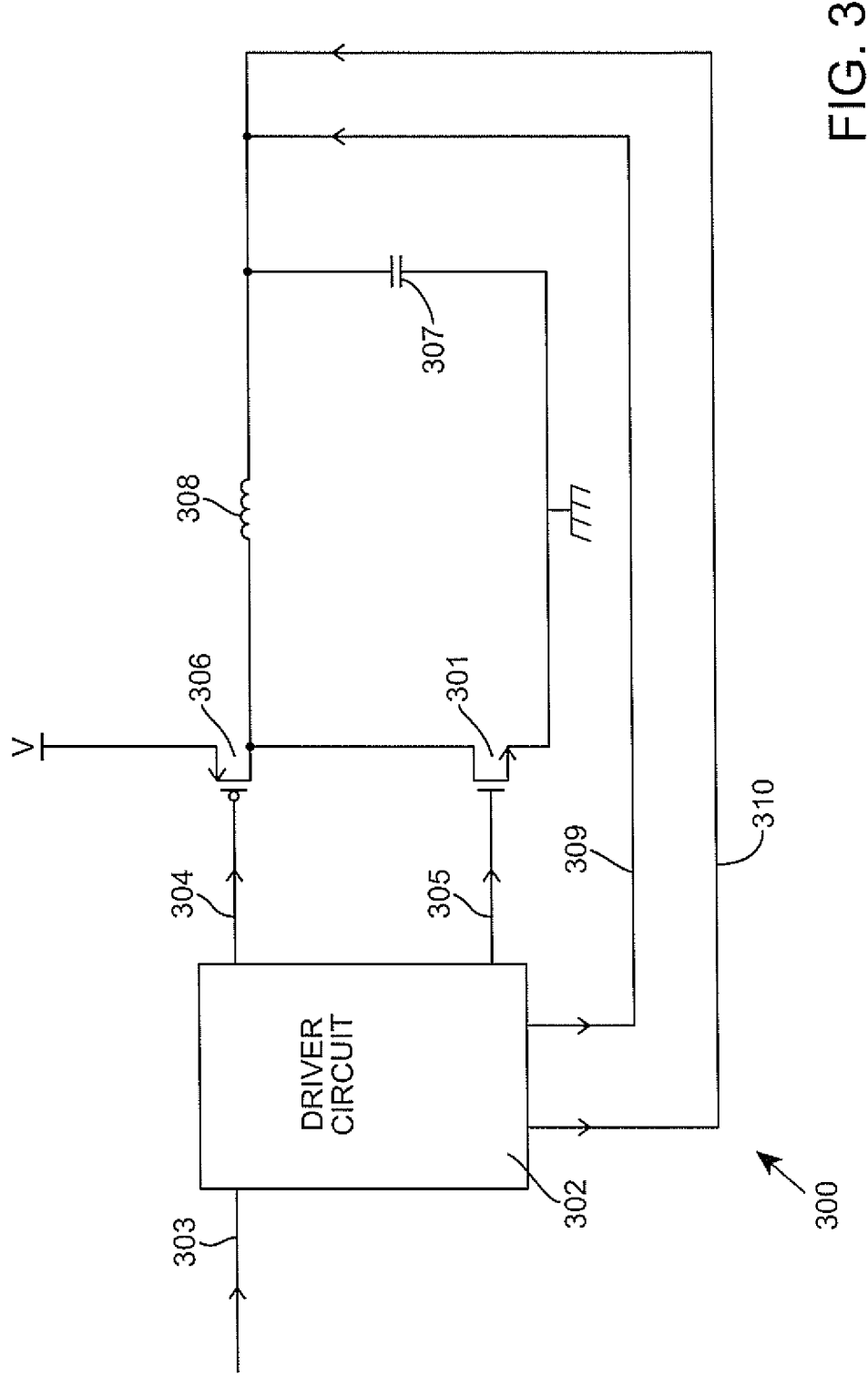
FIG. 3 is a simplified block diagram of a voltage converter in accordance with a second embodiment of the invention.

Referring now to FIG. 3, a simplified block diagram of a voltage converter 300 in accordance with a second embodiment of the invention is shown. The voltage converter 300 can operate as a synchronous voltage converter or regulator. This second embodiment includes a rectifier transistor 301 rather than the rectifier diode of FIG. 2. In this example the rectifier transistor 301 is an N-channel MOSFET (metal oxide semiconductor field effect transistor) power transistor whose source is grounded although a P-channel MOS transistor may be used for certain applications. The use of a transistor rather than a diode allows current to flow with a lower voltage drop, thereby increasing efficiency of the voltage converter 300. A driver circuit module 302 receives a PWM signal on line 303 from a PWM generator (not shown) and comprises substantially the same functionality as the driver circuit 201 of FIG. 2 with the additional capability to control charge harvesting from two power transistors. Two outputs 304, 305 from the driver circuit module 302 are connected to, respectively, a gate terminal of a switching transistor 306, which in this example is a PMOS power transistor, and a gate terminal of the rectifier transistor 301. A source terminal of the switching transistor 306 is connected to a power supply, V. Drain terminals of the switching transistor 303 and the rectifier transistor 301 are connected to one end of an inductor 308, which other end is connected to the first terminal of a load capacitor 307, whose second terminal is connected to ground.

Two output lines 309, 310 from the driver circuit module 302 are provided to ensure that charge can be harvested from the gate capacitance of both the switching transistor 306 and rectifier transistor 301 and transferred to the first terminal of the load capacitor 307.

In the two-power MOSFET arrangement of FIG. 3, the driver circuit module 302 can be arranged to drive one of the MOSFETs 301, 306 on while driving the other off, or to drive them both off at the same time, depending on a chosen mode of operation. The driver control module 302 may also be arranged to ensure that no short circuit can exist where both power MOSFETs 301, 306 would be turned on at the same time. To ensure that all such cases are possible, the driver circuit module 302 can include circuitry for controlling the switching of each transistor 301, 306 independently of one another. In one example, the diver circuit module 302 may be arranged to set a different harvested charge return duration for the two power MOSFETs 301, 306 and also to set different slew rates for each harvested charge return cycle for the two MOSFETs 301, 306 (i.e., the rate of charging and discharging of parasitic capacitance of transistors 301 and 306).

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Although specific conductivity types or polarity of potentials have been described in the examples, it will be appreciated that conductivity types and polarities of potentials may be reversed.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality. For example, the functionality of the first and second logic modules of FIG. 1 may be performed by a single module.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected," or "operably coupled," to each other to achieve the desired functionality.

Furthermore, those skilled in the art will recognize that boundaries between the above described operations are merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Further, the entire functionality of the modules and discrete components shown in FIG. 1 may be implemented in an integrated circuit. Such an integrated circuit may be a package containing one or more dies. Alternatively, the examples may be implemented as any number of separate integrated circuits or separate devices interconnected with each other in a suitable manner. For example, an integrated circuit device may comprise one or more dies in a single package with electronic components provided on the dies that form the modules and which are connectable to other components outside the package through suitable connections such as pins of the package and bond wires between the pins and the dies.

The description of the preferred embodiments of the present invention has been presented for purposes of illustration and description, but is not intended to be exhaustive or to limit the invention to the forms disclosed. It will be appreciated by those skilled in the art that changes could be made to the embodiments described above without departing from the broad inventive concept thereof. It is understood, therefore, that this invention is not limited to the particular embodiment disclosed, but covers modifications within the spirit and scope of the present invention as defined by the appended claims.

The invention claimed is:

1. A voltage converter, comprising:
   a semiconductor switch coupled to a first terminal of an inductor;
   a rectifier connected to the semiconductor switch and the first terminal of the inductor;
   a load capacitor connected to a second terminal of the inductor; and
   a driver circuit, connected to the load capacitor and the second terminal of the inductor, for driving a gate terminal of the semiconductor switch to turn the semiconductor switch on and off, wherein charge stored on a parasitic capacitance of the gate of the semiconductor switch is transferred to the load capacitor, and wherein the driver circuit comprises:
   a first transistor having a gate terminal that receives a first control signal, a source terminal that receives a supply voltage, and a drain terminal connected to the gate terminal of the semiconductor switch; and
   a second transistor having a drain terminal connected to the drain terminal of the first transistor, a gate terminal that receives a second control signal, and a source terminal connected to the load capacitor.

2. The voltage converter of claim 1, wherein the driver circuit comprises a first control module that enables transfer of the stored charge to the load capacitor for predetermined periods of time.

3. The voltage converter of claim 2, wherein the driver circuit includes a switchable current path for providing a discharge path between the gate terminal of the semiconductor switch and ground.

4. The voltage converter of claim 3, wherein the driver circuit includes a second control module for switching in and out the switchable current path.

5. The voltage converter of claim 1, wherein the first transistor is a P-channel metal oxide semiconductor transistor and the second transistor is an N-channel metal oxide semiconductor transistor.

6. The voltage converter of any claim 5, wherein the semiconductor switch is a P-channel power metal oxide semiconductor transistor.

7. The voltage converter of claim 1, wherein the rectifier is a rectifier diode.

8. The voltage converter of claim 1, wherein the rectifier is a rectifier transistor.

9. The voltage converter of claim 8, wherein charge stored on a parasitic capacitance of the rectifier transistor is transferred to the load capacitor.

10. An integrated circuit including at least one voltage converter, the voltage converter comprising:
- a semiconductor switch coupled to a first terminal of an inductor;
- a rectifier coupled to the first terminal of the inductor and the semiconductor switch;
- a load capacitor connected to a second terminal of the inductor; and
- a driver circuit, connected to the load capacitor and the second terminal of the inductor, for driving a gate terminal of the semiconductor switch to turn the semiconductor switch on and off, wherein charge stored on a parasitic capacitance of the gate of the semiconductor switch is transferred to the load capacitor, and wherein the driver circuit comprises:
- a first transistor having a gate terminal that receives a first control signal, a source terminal that receives a supply voltage, and a drain terminal connected to the gate terminal of the semiconductor switch; and
- a second transistor having a drain terminal connected to the drain terminal of the first transistor, a gate terminal that receives a second control signal, and a source terminal connected to the load capacitor.

* * * * *